US007362538B2

(12) United States Patent
Lee et al.

(10) Patent No.: US 7,362,538 B2
(45) Date of Patent: Apr. 22, 2008

(54) TORQUE CONSTANT CORRECTION METHOD IN MULTIPLE SINUSOIDAL SEEK SERVO AND DISK DRIVE USING THE SAME

(75) Inventors: Jung-ho Lee, Suwon-si (KR); Kwang-jo Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 25 days.

(21) Appl. No.: 11/263,801

(22) Filed: Nov. 2, 2005

(65) Prior Publication Data

US 2006/0158772 A1 Jul. 20, 2006

(30) Foreign Application Priority Data

Jan. 18, 2005 (KR) .................. 10-2005-0004484

(51) Int. Cl.
*G11B 5/59* (2006.01)
(52) U.S. Cl. .................. 360/78.04; 360/31; 360/78.06
(58) Field of Classification Search ............... None
See application file for complete search history.

(56) References Cited

U.S. PATENT DOCUMENTS

| | | | | | |
|---|---|---|---|---|---|
| 4,697,127 | A | * | 9/1987 | Stich et al. ............... | 318/561 |
| 5,444,583 | A | * | 8/1995 | Ehrlich et al. ........... | 360/78.09 |
| 6,166,876 | A | * | 12/2000 | Liu ........................... | 360/78.04 |
| 6,532,129 | B1 | * | 3/2003 | Sri-Jayantha et al. .... | 360/77.02 |
| 6,801,384 | B2 | * | 10/2004 | Chu et al. ................. | 360/78.07 |
| 7,116,515 | B2 | * | 10/2006 | Chu et al. ................. | 360/78.07 |

FOREIGN PATENT DOCUMENTS

| | | |
|---|---|---|
| JP | 2002-150726 | 5/2002 |
| KR | 2001-7336 | 1/2001 |
| KR | 2005-54556 | 6/2005 |
| WO | WO 03-034430 | 4/2003 |

OTHER PUBLICATIONS

Notice to Submit Response issued by the Korean Intellectual Property Office for the corresponding Korean Application No. 10-2005-0004484 dated Jul. 20, 2006 (4 pages).

* cited by examiner

*Primary Examiner*—K. Wong
(74) *Attorney, Agent, or Firm*—Staas & Halsey LLP

(57) ABSTRACT

A disk drive control method and apparatus. In particular, a torque constant correction method and apparatus in a disk drive using a multiple sinusoidal seek servo scheme. The torque constant correction method includes: performing a test seek routine for torque constant correction by using a multiple sinusoidal seek scheme; storing a seek driving current trajectory value for driving a voice coil motor, the seek driving current trajectory value being generated from the test seek routine; calculating a primary harmonic sinusoidal coefficient by performing a discrete Fourier transformation on the driving current trajectory value; calculating a primary harmonic sinusoidal coefficient from a multiple-sinusoidal-seek design current trajectory applied to the test seek; and defining a torque constant correction value as a ratio of the primary harmonic sinusoidal coefficient calculated by performing the discrete Fourier transformation to the primary harmonic sinusoidal coefficient calculated from a multiple-sinusoidal-seek design current trajectory.

9 Claims, 4 Drawing Sheets

TORQUE CONSTANT CORRECTION METHOD IN MULTIPLE SINUSOIDAL SEEK SERVO AND DISK DRIVE USING THE SAME

CROSS REFERENCE TO RELATED APPLICATION

This application claims the benefit of Korean Patent Application No. 10-2005-0004484, filed on Jan. 18, 2005, in the Korean Intellectual Property Office, the disclosure of which is incorporated herein in its entirety by reference.

BACKGROUND OF THE INVENTION

1. Field of the Invention

The present invention relates to a disk drive control method and apparatus, and more particularly, to a torque constant correction method and apparatus in a disk drive using a multiple sinusoidal seek servo scheme.

2. Description of the Related Art

The related art of the present invention is disclosed in Korean Laid-Open Patent No. 2001-62386 and U.S. Pat. No. 5,465,035. Korean Laid-Open Patent No. 2001-62386 teaches a technique for reducing a seek noise and increasing a seek velocity with a seek acceleration waveform constructed with a generalized Fourier series determined using a minimum mean-square error (MMSE) scheme. U.S. Pat. No. 5,465,035 teaches a technique for increasing a seek velocity and minimizing device resonance based on a modified Bang-Bang seek scheme.

A disk drive includes magnetic transducers for reading and writing information by sensing magnetic fields of disks and magnetizing the disks, respectively. The information is written in sectors along circular tracks on disk surfaces. The circular tracks are identified by track numbers. A group of tracks vertically located on the disks are collectively referred to as a cylinder. Accordingly, a track may be identified by a cylinder number.

Each transducer is typically integrated in a slider which is incorporated into a head gimbal assembly (HGA). Each HGA is attached to an actuator arm. The voice coil is located adjacent to a magnetic assembly to define a voice coil motor (VCM). The disk drive includes a driving circuit for applying a current to excite the VCM and a controller. The excited VCM rotates the actuator arm to move the transducer across the disk surface.

When the information is read/written, the disk drive may operate a seek routine which directs the transducer to move from one cylinder to the other cylinder. During the operation of the seek routine, the VCM is excited by a current used to move the transducer to a new position on the disk surface. In addition, the controller operates a servo routine which ensures the transducer moves to the accurate cylinder and center of the track.

Many kinds of disk drives use a "Bang-Bang" control algorithm to move the transducer to their accurate position in the shortest time. Typically, a square wave form current is used for a seek routine using the "Bang-Bang" control algorithm. Since the square wave form has high-frequency harmonic components, it generates mechanical resonance in a head gimbal assembly (HGA), so that mechanical components or assemblies may be excited up to a high natural frequency. In turn, the associated remaining resonance generates an audible noise or an undesirable vibration, and there is a need for the associated extension of a stabilizing time.

In order to solve these problems, there has been developed a seek servo technique using a sinusoidal seek trajectory. Although it can reduce the audible noise compared with the "Bang-Bang" seek servo technique, the sinusoidal seek servo technique still has the problem of a long seek time.

Recently, in order to overcome the shortcomings of the sinusoidal seek servo technique, a multiple sinusoidal seek servo technique using a multiple sinusoidal trajectory has been developed. Compared with the "Bang-Bang" seek servo technique, the multiple sinusoidal seek servo technique can reduce the audible noise. In addition, compared with the single sinusoidal seek servo technique, the multiple sinusoidal seek servo technique can reduce the seek time.

In general, a torque constant of a voice coil motor (VCM) in a disk drive varies depending on an assembled state of a head disk assembly (HDA), characteristics of parts of the VCM, and gain characteristics of a digital-to-analog converter (DAC) of a VCM driver. Therefore, a design torque constant determined in a servo design stage is different from a real torque constant of a real disk drive. In order to compensate for the difference between the design and real torque constants, there is a need for a torque constant correction process. Typically, the torque constant correction process is performed at the time that the disk drive is powered on.

Conventionally, in the disk drive using the multiple sinusoidal seek servo scheme, the torque constant correction process is carried out as follows.

In the torque constant correction process, a test seek is performed based on a primary harmonic sinusoidal coefficient having the same form as that of a single sinusoidal seek trajectory which is obtained from a multiple sinusoidal seek trajectory corresponding to a length of the test seek. Next, a torque constant correction value is calculated from a ratio of a real seek driving current trajectory magnitude to a design current trajectory magnitude corresponding to a design acceleration trajectory.

Next, the torque constant correction process is performed according to a seek servo scheme using the single sinusoidal seek trajectory. After that, the process is converted into a seek servo scheme using a desired-order multiple sinusoidal seek trajectory, and the seek servo is performed.

The seek servo scheme used for the torque constant correction process is different from the seek servo scheme used to perform the data read and write operations. Therefore, there is a problem in that real design is too complicated. In addition, there is another problem in that a size of associated codes is too large.

SUMMARY OF THE INVENTION

Additional aspects and/or advantages of the invention will be set forth in part in the description which follows and, in part, will be apparent from the description, or may be learned by practice of the invention.

The present invention provides a torque constant correction method for a disk drive using a multiple sinusoidal seek servo scheme, wherein a torque constant correction value is generated by using a multiple sinusoidal trajectory.

The present invention also provides a disk drive using the torque constant correction method.

According to an aspect of the present invention, there is provided a torque constant correction method for a disk drive, including: performing a test seek routine for torque constant correction by using a multiple sinusoidal seek scheme; storing a seek driving current trajectory value for driving a voice coil motor, the seek driving current trajectory value being generated from the test seek routine; calculating a primary harmonic sinusoidal coefficient by performing a discrete Fourier transformation on the driving current trajectory value; calculating a primary harmonic sinusoidal coefficient from a multiple-sinusoidal-seek design current trajectory applied to the test seek; and defining a torque constant correction value a ratio of the primary harmonic sinusoidal coefficient calculated by performing the discrete Fourier transformation to the primary harmonic sinusoidal coefficient calculated from the multiple-sinusoidal-seek design current trajectory.

According to another aspect of the present invention, there is provided a disk drive including: a disk storing information; a spindle motor rotating the disk; a transducer writing and reading information to or from the disk; a voice coil motor moving the transducer; and a controller controlling the voice coil motor with a seek routine using a multiple sinusoidal seek scheme, wherein, at an initial driving time for the disk drive, the controller obtains a seek driving current trajectory value for driving the voice coil motor generated from a test seek according to the multiple sinusoidal seek scheme, calculates a primary sinusoidal coefficient by performing a discrete Fourier transformation on the real seek driving current trajectory value, and defines a torque constant correction value as a ratio of the primary harmonic sinusoidal coefficient by performing the discrete Fourier transformation to a primary harmonic sinusoidal coefficient calculated from a multiple-sinusoidal-seek design current trajectory applied to the test seek.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
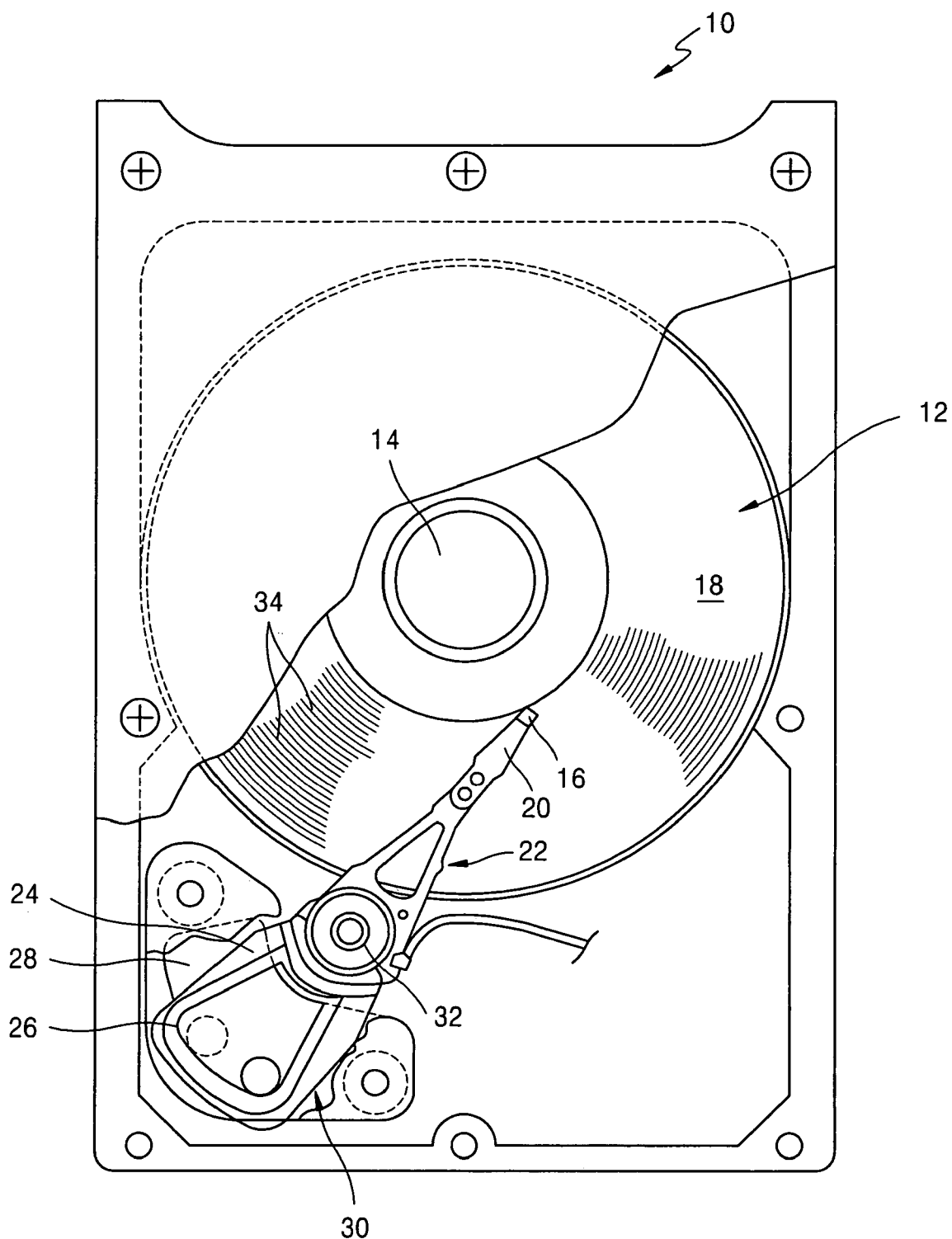
FIG. 1 is a plan view showing a disk drive according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

First, a disk drive according to the present invention is described.

FIG. 1 is a top view of a disk drive 10 according to the present invention.

The disk drive 10 includes at least one magnetic disk 12 which is rotated by a spindle motor 14. In addition, the disk drive 10 includes a transducer 16 located adjacent to a disk surface of the magnetic disk 12.

The transducer 16 can write and read information on the magnetic disk 12 by magnetizing the magnetic disk 12 and sensing the magnetic field of the magnetic disk 12, respectively. Typically, the transducer 16 is associated with the surface of the magnetic disk 12. Although a single transducer 16 is shown and described, it should be understood that the transducer is divided into a write transducer for magnetizing the magnetic disk 12 and a separate read transducer for sensing the magnetic field of the magnetic disk 12. The read transducer may be made of a magneto-resistive (MR) material.

The transducer 16 may be integrated into a slider 20. The slider 20 may be constructed to create an air bearing between the transducer 16 and the surface of the magnetic disk 12. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. A current applied to the voice coil 26 generates a torque for rotating the actuator arm 24 about a bearing assembly 32. Rotation of the actuator arm 24 moves the transducer 16 across the surface of the magnetic disk 12.

Information is typically stored in circular tracks 34 of the magnetic disk 12. In general, each track 34 is divided into a plurality of sectors. Each sector may include a data field and an identification field. The identification field may contain gray code information which identifies the sector and track (cylinder). The transducer 16 is moved across the surface of the magnetic disk 12 to write or read information stored in another track.

Figure 2:
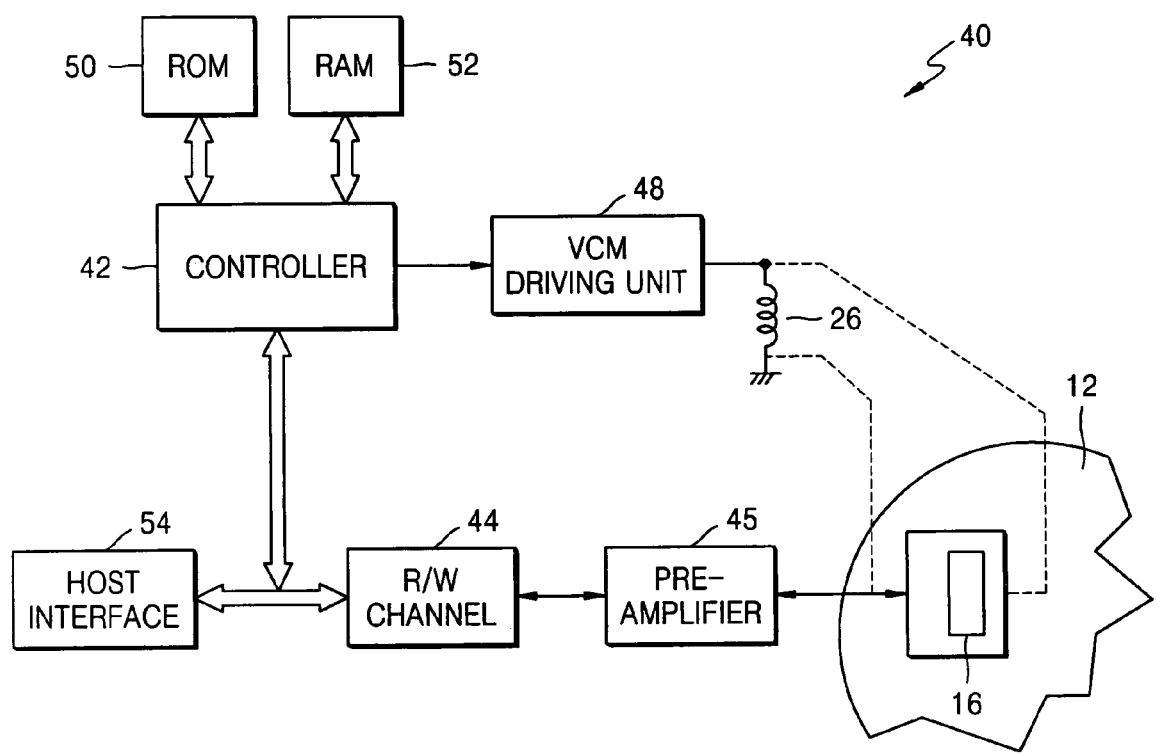
FIG. 2 is a diagram of an electronic system for controlling the disk drive according to the present invention.

FIG. 2 is a schematic diagram of the electronic system 40 for controlling the disk drive 10 according to the present invention. The electronic system 40 includes a controller 42 coupled to the transducer 16 by a read/write (R/W) channel circuit 44 and a pre-amplifier circuit 45. Examples of the controller 42 include a digital signal processor (DSP), a microprocessor, and a microcontroller. The controller 42 applies control signals to the read/write channel circuit 44 in order to read/write information from/to the magnetic disk 12. The information is typically transmitted from the R/W channel circuit 44 to a host interface circuit 54. The host interface circuit 54 includes a buffer memory and a control circuit which allow the disk drive 10 to interface with a system such as a personal computer.

The controller 42 is also coupled to a VCM driving unit 48 which applies a driving current to the voice coil 26. The controller 42 applies control signals to the VCM driving unit 48 to control the excitation of the VCM 30 and the movement of the transducer 16.

The controller 42 is connected to a non-volatile memory device 50 such as a read only memory (ROM) device or a flash memory device, and a random access memory (RAM) device 52. The memory devices 50 and 52 contain commands and data used by the controller 42 to perform software routines. One of the software routines is a seek routine used to move the transducer 16 from one track to another track. The seek routine includes a servo control routine to ensure that the transducer 16 moves to a target track. The memory device 50 contains equations used to generate the multiple sinusoidal acceleration trajectory.

Figure 3:
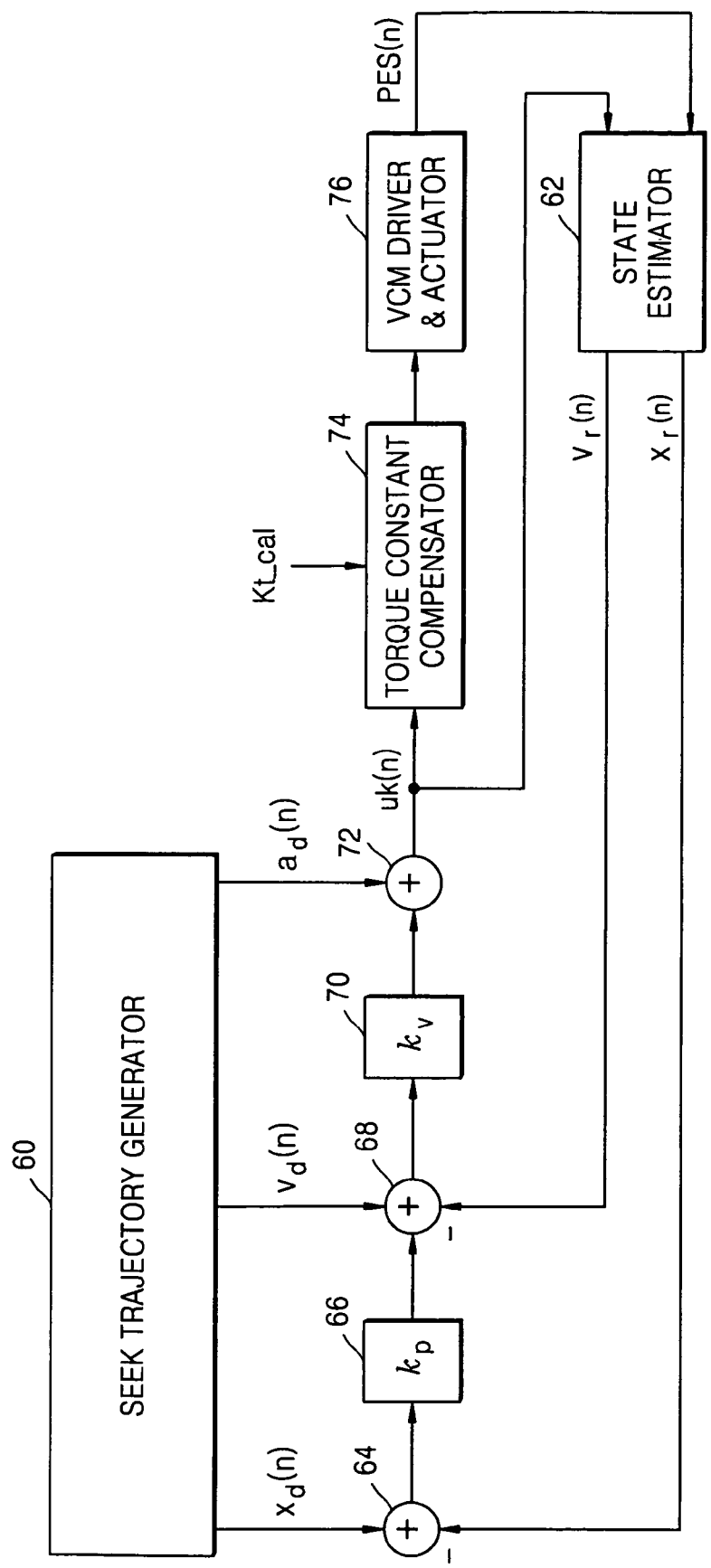
FIG. 3 is a diagram of a servo control system of the disk drive according to the present invention.

FIG. 3 is a schematic diagram of a track seek servo control system of the disk drive 10 according to the present invention. The track seek servo control system is executed by the aforementioned controller 42, and implemented in hardware and/or software. The track seek servo control system ensures that the transducer 16 is accurately located on a desired track of the magnetic disk 12. When the controller 42 performs a seek routine, the transducer 16 moves from a current track to a new target track. The gray codes of one or more tracks located between the current track and the new target track are read as the transducer 16 moves across the disk 12. This allows the controller 42 to periodically determine whether the transducer 16 is moving at a desired speed and acceleration across the tracks.

The track seek servo control system includes a state estimator 62, which may be implemented in software and/or hardware. The state estimator 62 can determine a real distance and position $x_r(n)$ to which the transducer 16 has moved from the current track. The real position $x_r(n)$ can be determined by reading the gray code of a track beneath the transducer 16. The state estimator 62 can also determine a real velocity $v_r(n)$ of the transducer 16. The gray codes can be periodically sampled as the transducer 16 moves to the new track location, so that the controller 42 can control the movement of the transducer 16.

Every time that the transducer 16 reads the gray code of the track 34, a seek trajectory generator 60 calculates a design position $x_d(n)$, a design velocity $v_d(n)$ and a design acceleration $a_d(n)$ of the transducer 16 by using the velocity and acceleration trajectories obtained by integrating the multiple sinusoidal acceleration and velocity trajectories, respectively. Here, a design current value is generated by multiplying the design acceleration $a_d(n)$ with a current conversion constant value.

In a first summing unit 64, the real position $x_r(n)$ is subtracted from the design position $x_d(n)$. In a position control gain corrector 66, a position correction value is generated by multiplying a position gain $k_p$ with a difference between the real position $x_r(n)$ and the design position $x_d(n)$ obtained in the first summing unit 64.

In a second summing unit 68, the real velocity $v_r(n)$ is subtracted from sum of the design velocity $v_d(n)$ and the position correction value obtained in the position control gain corrector 66.

In a velocity control gain corrector 70, a velocity correction value is generated by multiplying a velocity gain $k_v$, with the value obtained in the second summing unit 68.

Next, a third summing unit 72 adds the velocity correction value to a real acceleration value to generate a VCM driving current value uk(n). The VCM driving current value uk(n) corresponds to a seek driving current value.

A torque constant compensator 74 generates a torque-corrected seek driving current value by multiplying the VCM driving current value uk(n) with a torque constant correction value corresponding to a change in torque of the disk drive and applies the generated torque-corrected seek driving current value to a VCM driver/actuator 76. The VCM driver/actuator 76 converts the torque-corrected seek driving current value into an analog current signal and applies the analog current signal to the voice coil. As a result, the torque change is compensated by a current trajectory applied to the voice coil.

As described above, the torque constant compensator 74 outputs the multiplication result (obtained by multiplying the VCM driving current value uk(n) with the torque constant correction value) determined for each position according to the change in torque of the disk drive. Therefore, the seek control loop gain value varies depending on the torque constant correction value.

Figure 4:
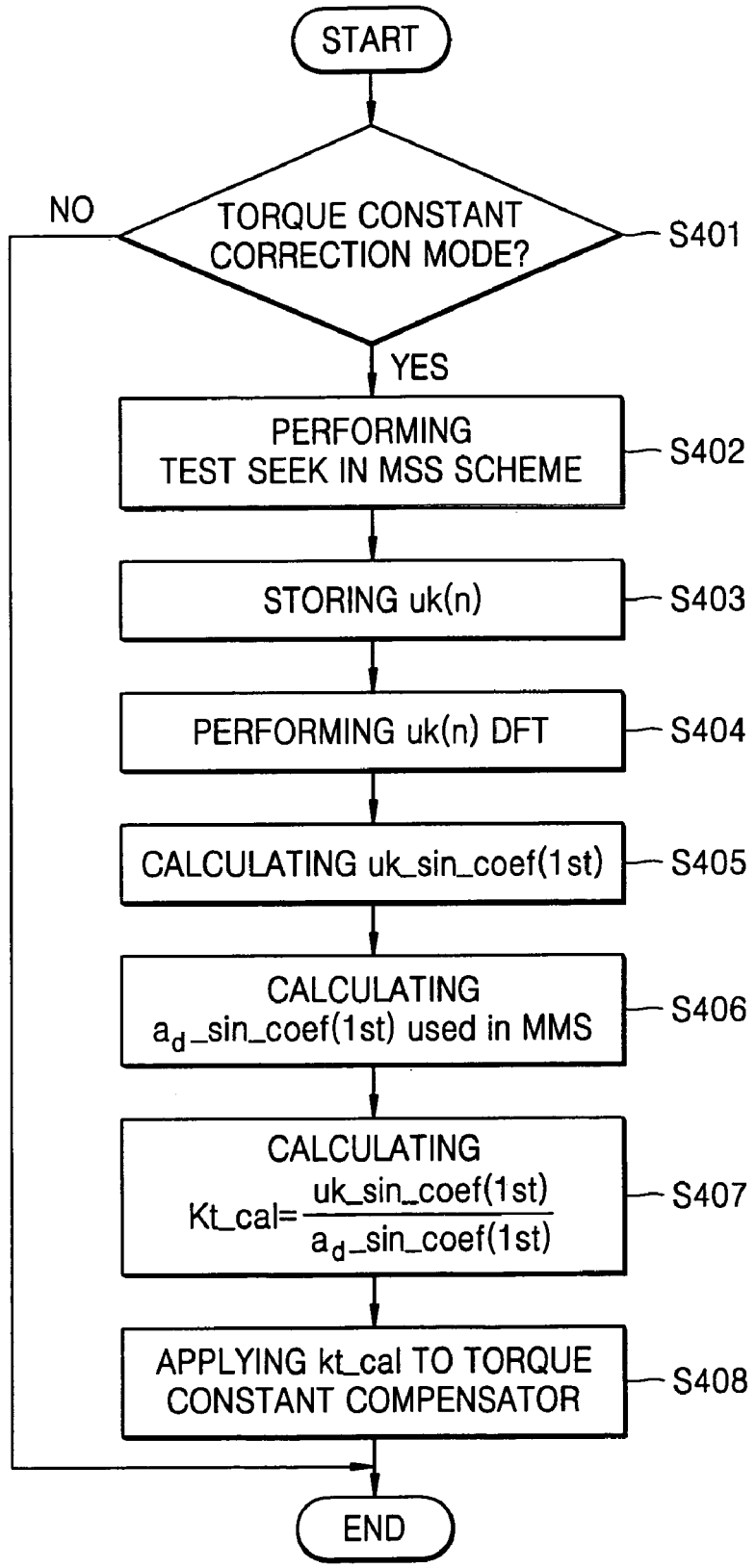
FIG. 4 is a flowchart of a torque constant correction method in a multiple sinusoidal seek servo according to the present invention.

Now, a torque constant correction method according to the present invention will be described with reference to the flowchart of FIG. 4.

Firstly, the controller 42 determines whether or not the disk drive is transitioned into a torque constant correction mode (S401). As an example, the torque constant correction mode may be designed to start up every time that the disk drive is powered on.

In the torque constant correction mode, the controller 42 performs a test seek for torque constant correction according to a multiple sinusoidal seek scheme (S402). Here, a length of the test seek is determined to be the number of servo samples which the multiple sinusoidal servo can be performed on. For example, the length may be determined to be the number of servo samples corresponding to one rotation of the disk.

During the test seek, the seek driving current value uk(n) for each servo is stored in a buffer (not shown) of the controller 42 (S403).

After the test seek, a discrete Fourier Transformation (DFT) is performed on the seek driving current value uk(n) (S404). Next, a primary harmonic sinusoidal coefficient uk_sin_coef(1st) of the seek driving current trajectory uk(n) is calculated by using Equation 1 (S405).

$$\text{uk\_sin\_coef}(1st) = \frac{2}{N}\sum_{n=0}^{N-1} uk(n) \cdot \sin(2\pi f_1 Ts \cdot n) \qquad \text{[Equation 1]}$$

Here, Ts is a sampling time, f1 is a primary harmonic frequency, and N is the number of uk stored in the buffer during the test seek.

Next, a primary harmonic sinusoidal coefficient $a_{d\_\text{sin}\_}$ coef(1st) is calculated from the multiple-sinusoidal-seek design current trajectory applied to the test seek (S406).

Next, a torque constant correction value kt_cal is calculated by using Equation 2 (S407).

$$\text{Kt\_cal} = \frac{\text{uk\_sin\_coef}(1st)}{a_{d\_\text{sin}\_}\text{coef}(1st)} \qquad \text{[Equation 2]}$$

Next, the torque constant correction value kt_cal is applied to the torque constant compensator 74 (S408).

According to the present invention, in a disk driver for performing a seek servo using a multiple sinusoidal trajectory, a torque constant correction value can be calculated by performing a seek routine using the multiple sinusoidal trajectory. Therefore, unlike a conventional technique, it is unnecessary to perform a separate seek routine using a single sinusoidal trajectory in a torque-constant-correction-value generation process. As a result, it is possible to reduce a size in code. In addition, in comparison to a conventional technique, it is possible to simply calculate the torque constant correction value.

The present invention may be implemented as a method, apparatus, system, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a disk, a fiber optic medium, a radio frequency (RF) link, etc. The computer data signal may include any signal that can propagate over a transmission medium such as electronic network channels, optical fibers, air, electromagnetic, RF links, etc.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A torque constant correction method for a disk drive, comprising:

performing a test seek routine for torque constant correction by using a multiple sinusoidal seek scheme;

storing a seek driving current trajectory value for driving a voice coil motor, the seek driving current trajectory value being generated from the test seek routine;

calculating a primary harmonic sinusoidal coefficient by performing a discrete Fourier transformation on the driving current trajectory value;

calculating a primary harmonic sinusoidal coefficient from a multiple-sinusoidal-seek design current trajectory applied to the test seek; and defining a torque constant correction value as a ratio of the primary harmonic sinusoidal coefficient calculated by performing the discrete Fourier transformation to the primary harmonic sinusoidal coefficient calculated from the multiple sinusoidal seek design current trajectory.

2. The torque constant correction method according to claim 1, wherein a length of the test seek is determined to be the number of servo samples which the multiple sinusoidal seek scheme is performed on.

3. The torque constant correction method according to claim 1, wherein the primary harmonic sinusoidal coefficient uk_sin_coef(1st) for the driving current trajectory value is calculated by using the following equation $$\mathrm{uk\_sin\_coef}(1st) = \frac{2}{N}\sum_{n=0}^{N-1} uk(n)\cdot \sin(2\pi f_1 Ts\cdot n),\text{ and}$$

wherein Ts is a sampling time, f1 is a primary harmonic frequency, and N is the number of uk stored in a buffer during test seek.

4. A disk drive comprising:
a disk storing information;
a spindle motor rotating the disk;
a transducer writing and reading information to or from the disk;
a voice coil motor moving the transducer; and
a controller controlling the voice coil motor with a seek routine using a multiple sinusoidal seek scheme,
wherein, at an initial driving time for the disk drive, the controller obtains a seek driving current trajectory value for driving the voice coil motor generated from a test seek according to the multiple sinusoidal seek scheme, calculates a primary sinusoidal coefficient by performing a discrete Fourier transformation on the real seek driving current trajectory value, and defines a torque constant correction value as a ratio of the primary harmonic sinusoidal coefficient by performing the discrete Fourier transformation to a primary harmonic sinusoidal coefficient calculated from a multiple-sinusoidal-seek design current trajectory applied to the test seek.

5. The disk drive according to claim 4, wherein a length of the test seek is determined to be the number of servo samples which the multiple sinusoidal seek scheme is performed on.

6. The disk drive according to claim 4,
wherein the primary harmonic sinusoidal coefficient uk_sin_coef(1st) for the driving current trajectory value is calculated by using the following equation $$\mathrm{uk\_sin\_coef}(1st) = \frac{2}{N}\sum_{n=0}^{N-1} uk(n)\cdot \sin(2\pi f_1 Ts\cdot n),\text{ and}$$

wherein Ts is a sampling time, f1 is a primary harmonic frequency, and N is the number of uk stored in a buffer during test seek.

7. A disk drive comprising:
a magnetic disk rotated by a spindle motor;
a transducer located adjacent to a disk surface of the magnetic disk to write/read information to/from the magnetic disk by magnetizing the magnetic disk and sensing a magnetic field of the magnetic disk;
a voice coil motor to rotate the transducer; and
a controller controlling the voice coil motor with a seek routine using a multiple sinusoidal seek scheme,
wherein the controller calculates a seek driving current trajectory value for driving the voice coil motor generated from a test seek according to a multiple sinusoidal seek scheme, calculates a primary sinusoidal coefficient by performing a discrete Fourier transformation on the real seek driving current trajectory value, and defines a torque constant correction value as a ratio of the primary harmonic sinusoidal coefficient by performing the discrete Fourier transformation to a primary harmonic sinusoidal coefficient calculated from a multiple-sinusoidal-seek design current trajectory applied to the test seek.

8. The disk drive of claim 7, wherein a length of the test seek is determined to be the number of servo samples which the multiple sinusoidal seek scheme is performed on.

9. The disk drive of claim 7, wherein the primary harmonic sinusoidal coefficient uk_sin_coef(1st) for the driving current trajectory value is calculated by using the following equation $$\mathrm{uk\_sin\_coef}(1st) = \frac{2}{N}\sum_{n=0}^{N-1} uk(n)\cdot \sin(2\pi f_1 Ts\cdot n),$$

wherein uk_sin_coef(1st) is the primary harmonic sinusoidal coefficient, Ts is a sampling time, f1 is a primary harmonic frequency, and N is the number of uk stored in a buffer during test seek.

* * * * *